(12) United States Patent
Vataja

(10) Patent No.: US 7,500,270 B2
(45) Date of Patent: Mar. 3, 2009

(54) METHOD FOR UTILIZING INTELLIGENT CLOCK CONTROLLER IN DIGITAL RIGHTS MANAGEMENT

(75) Inventor: Timo Vataja, Tampere (FI)

(73) Assignee: Nokia Corporation, Espoo (FI)

( * ) Notice: Subject to any disclaimer, the term of this patent is extended or adjusted under 35 U.S.C. 154(b) by 795 days.

(21) Appl. No.: 11/040,818

(22) Filed: Jan. 20, 2005

(65) Prior Publication Data

US 2005/0204209 A1    Sep. 15, 2005

(30) Foreign Application Priority Data

Jan. 21, 2004    (FI) .................................. 20040085

(51) Int. Cl.
   G06F 7/04     (2006.01)
   G06K 9/00     (2006.01)
   H03M 1/68     (2006.01)
   H04L 9/00     (2006.01)
   H04K 1/00     (2006.01)
   H04N 7/16     (2006.01)

(52) U.S. Cl. ....................................... 726/30; 713/187

(58) Field of Classification Search .................. 463/29; 705/59; 707/9; 713/2, 153, 200; 726/26; 380/278

See application file for complete search history.

(56) References Cited

U.S. PATENT DOCUMENTS

| | | | |
|---|---|---|---|
| 6,302,795 B1 * | 10/2001 | Ito ............................... | 463/29 |
| 6,330,670 B1 * | 12/2001 | England et al. ................ | 713/2 |
| 6,961,858 B2 * | 11/2005 | Fransdonk .................... | 726/29 |
| 7,134,144 B2 * | 11/2006 | McKune ....................... | 726/26 |
| 7,233,948 B1 * | 6/2007 | Shamoon et al. ............. | 707/9 |
| 2002/0120465 A1 | 8/2002 | Mori et al. | |
| 2003/0163684 A1 * | 8/2003 | Fransdonk .................... | 713/153 |
| 2005/0044397 A1 * | 2/2005 | Bjorkengren ............... | 713/200 |
| 2007/0233609 A1 * | 10/2007 | Bovee et al. .................. | 705/59 |

(Continued)

FOREIGN PATENT DOCUMENTS

EP     1308949     5/2003

(Continued)

OTHER PUBLICATIONS

Thomas, Mundt, Location Dependent Digital Rights Management; Year 2005; IEEE; pp. 1-6.*

*Primary Examiner*—Kambiz Zand
*Assistant Examiner*—Monjour Rahim
(74) *Attorney, Agent, or Firm*—Alfred A. Fressola; Ware, Fressola, Van Der Sluys & Adolphson LLP

(57) ABSTRACT

The invention relates to a method, electronic device and computer program for providing digital rights management. The electronic device comprises a first clock and an optional second clock. The electronic device may store at least one protected media object and rights associated with the media object. A time attack event is detected in the electronic device. A barring time is increased when a time attack event occurs. The barring time is decreased regularly. It is checked whether the barring time exceeds a predefined value at a request to present at least one media object. The at least one media object is presented if that is allowed by rights associated with the at least one media object and the barring time does not exceed the predefined value. The benefits of the invention are related to improved enforcement of digital rights.

33 Claims, 6 Drawing Sheets

U.S. PATENT DOCUMENTS

2007/0258595 A1* 11/2007 Choy .................... 380/278
2008/0066181 A1* 3/2008 Haveson et al. ............ 726/26
2008/0086423 A1* 4/2008 Waites .................... 705/59

FOREIGN PATENT DOCUMENTS

| | | |
|---|---|---|
| EP | 1361495 | 11/2003 |
| EP | 1406193 | 4/2004 |
| JP | 2000099324 | 4/2000 |
| WO | WO 03049473 | 6/2003 |

* cited by examiner

METHOD FOR UTILIZING INTELLIGENT CLOCK CONTROLLER IN DIGITAL RIGHTS MANAGEMENT

CROSS-REFERENCE TO RELATED APPLICATIONS

This application claims priority under 35 USC §119 to Finnish Patent Application No. FI 20040085 filed on Jan. 21, 2004.

BACKGROUND OF THE INVENTION

1. Field of the Invention

The invention relates to digital rights management in electronic devices. Particularly, the invention relates to the use of an intelligent clock controller preventing the misuse of time limit protected digital content.

2. Description of the Related Art

Since the introduction of digital storage technologies more effective copyright enforcement has become an issue. Especially, the emergence of the Internet as an illicit distribution channel for copyright protected content has created a strong demand for new technologies in copyright protection. One such technology is the Digital Rights Management (DRM). The DRM is a common term for standards and proprietary systems where a given content item is augmented with information that specifies user rights associated with it. The content item may, for example, be an audio recording, video, picture, computer program or simply a document. The user rights may comprise various rules pertaining to the use of the content item. For example, a user may be given a time limit during which the content item can be presented, in other words, rendered to the user. Allowed number of listening times, allowed device identities and partial viewing rights are other examples of rules pertaining to the use of a content item. The DRM requires that the presentation device and the presentation software in it are not hostile, that is, they participate in the enforcement of digital rights. In the presentation device there is usually a DRM agent, or in other words, a DRM engine, which enforces the DRM rights and protects the content items from illicit copying. In order to avoid making a DRM protected content item available for copying, the content item may be encrypted while it is in transit from the network to the presentation device and while it is stored in the presentation device outside of the DRM engine, for example, on a hard disk.

One standard for the DRM is the one based on Open Mobile Alliance (OMA) DRM specification. The aim of the OMA DRM is to enable controlled consumption of digital media objects by allowing content providers to express content rights. The media objects are content items such as audio clips, video clips, pictures, Java applications and documents. Content items governed by rights are referred to as assets. In the OMA DRM content rights are expressed as document objects, that is, documents written using a Rights Expression Language (REL). In order to specify the rights pertaining to an asset it is associated with a REL object. The association between a REL object and an asset may be specified explicitly by mentioning the asset's identifier in the REL object or implicitly by providing the REL object in a same message together with the asset.

Reference is now made to FIG. 1, which illustrates the downloading of media and REL objects to a mobile terminal that is equipped with a DRM agent in prior art. In FIG. 1 there is a Mobile Terminal (MT) 100, which is used as the content presentation device. MT 100 may be a terminal of a cellular mobile network such as the Universal Mobile Telecommunications System (UMTS), or it may be a WLAN terminal or a fixed network terminal. MT 100 has a radio connection to a base station 120, if it is a wireless terminal. Base station 120 is in an access network 110, which provides access to the Internet, a private IP network or any other network, which is used for DRM content delivery. MT 100 is connected via intervening networks such as access network 110 to a content source 130, which provides DRM protected content to MT 100. In the OMA DRM there are three possible methods for delivering content to a terminal and a DRM agent therein. Content is delivered to a terminal in DRM messages. In a DRM message there is a media object and an optional rights object, that is, a REL object. The first method, which is represented in FIG. 1 by arrow 140, is called forward-lock. In this method no REL object is associated with media object 150. Media object 150 is sent in a DRM message, which has no REL object. Default rights known to MT 100 are applied for media object 150. For example, they may prevent further distribution of media object 150 to any other terminal. The second method, which is represented in FIG. 1 by arrow 142, is referred to as combined delivery. In the combined delivery, a media object 153 is sent together with REL object 154 in a DRM message. In the third method, which is represented in FIG. 1 by arrows 144 and 146, media object 156 and REL object 158 are provided separately. They may be sent via different transports.

Reference is now made to FIG. 2, which illustrates the architecture of a prior art mobile terminal that is equipped with a DRM agent. A Mobile Terminal (MT) 100 is in communication with a base station 120, which is in association with an access network 110. To access network 110 is connected a network node 292, which provides network time for mobile terminals in access network 110. MT 100 comprises a DRM engine 202, in other words, a DRM agent, a media application 204, a secure clock 206 or a user interface clock 208. In MT 100 may be stored at least one media object 210, which is provided via DRM engine 202 to media application 204. DRM engine 202 may decrypt media object 210, if it has been encrypted for protection. The optional encryption has been performed in a content source such as content source 130 using encryption that can only be decrypted using a key available to DRM engine 202. MT 100 stores also at least one REL object 214. REL object 214 is used by DRM engine 202 to check the user rights pertaining to a given media object such as media object 210. DRM engine 202 checks the user rights before making media object 210 available via media application 204 for rendering to the user. In the case of time based rights DRM engine 202 checks current time from either secure clock 206, provided that it is available in MT 100, or from user interface clock 208. Typically, REL object 214 may specify a timeslot during which the presentation of media object 210 for the user is allowed. In other words, it may specify a start time and end time between which media object 210 may be presented to the user. If current time falls in this timeslot allowed by REL object 214, DRM engine 202 provides media object for media application 204 to be rendered. Secure clock is safe from the DRM point of view, because the time in it is provided from network using messages represented by arrow 290 in FIG. 2. The time is provided using, for example, UMTS Network Information and Time Zone service (NITZ) or any other network time protocol, which is regarded as safe from malicious time altering either in transit from node 292 or even in node 292. User interface clock 208 is not safe from the DRM point of view, since time and date information in it may be modified by user at will. There is also a backup storage 212 in association with MT 100 to which any information comprising REL objects 214 and media objects 210 can be stored for backup purposes. The backup and restoring process is illustrated using arrows 228 and 230.

There are problems in a mobile terminal architecture such as illustrated in FIGS. 1 and 2. Firstly, it is possible that there is no secure clock available in mobile terminal. In this case it is possible that time and date information is manipulated by user to deceive the DRM engine so that a media object may be presented to the user despite the fact that the REL object associated with it has an end time that is factually past. If there is no control, the user may manipulate time and date information repeatedly, which vitiates the time limit based DRM protection completely. Secondly, it is possible that in some cases network time information may also not be reliable, if the network node providing time information is not maintained properly. In small network environments it also possible that network time is manipulated similarly to circumvent time based DRM protection.

SUMMARY OF THE INVENTION

The invention relates to a method of providing digital rights management in an electronic device, comprising a first clock. In the method a time attack event is detected in the electronic device; a barring time is increased in response to the time attack event; the barring time is checked at a request to present at least one media object; and the at least one media object is presented if that is allowed by rights associated with the at least one media object and the barring time does not exceed a predefined value.

The invention relates also to an electronic device providing digital rights management, which comprises a first clock. The electronic device further comprises: clock controller means configured to detect a time attack event and to increase a barring time in response to the time attack event; and presenting means configured to check whether the barring time exceeds a predefined value and whether a request to present at least one protected media object is detected by it.

The invention relates also to a computer program comprising code adapted to perform the following steps when executed on a data-processing system: detecting a time attack event in the electronic device; increasing a barring time in response to the time attack event; checking the barring time at a request to present a media object; and presenting the media object if it is allowed by rights associated with the media object and the barring time does not exceed a predefined value.

By a time attack event is meant herein an event related to the altering of time, the purpose of which is to bypass time-based protection associated with at least one media object.

In one embodiment of the invention, the electronic device comprises a second clock, which is adjusted based on time information from a network.

In one embodiment of the invention, a time attack event occurs when time in the first clock is updated and presentation of at least one protected media object is attempted within a predefined time period after the updating of time.

In one embodiment of the invention, a time attack event occurs if the last time signal received from a network indicates a time that is later than time in the first clock and presentation of at least one protected media object is attempted. The time signal from the network may be, for example, time information provided using UMTS Network Information and Time Zone service (NITZ). NITZ provides current time in notification messages that are sent to the electronic device. The electronic device may extract the time signal from content messages or rights messages that are delivered to it. The latest time signal from the network may be stored to a secure storage in the electronic device. The secure storage is not lost when the electronic device is powered off. The secure storage may be, for example, a flash memory. The last time signal received from the network is thereby made always available for the prevention of time attacks involving the manipulation of time in the first clock.

In one embodiment of the invention, a time attack event occurs when time in the second clock is ahead of time in the first clock and presentation of at least one protected media object is attempted.

In one embodiment of the invention rights that are associated with media objects are represented as rule objects or documents, for example, expressed in OMA REL format.

In one embodiment of the invention, the barring time is decreased regularly. The barring time may be decreased regularly at predefined time intervals by the clock controller means.

By a barring time is meant herein a time during which a user is prevented from starting time range protected media objects. Examples of time range protected media objects are objects that have associated with them OMA REL document objects, which specify a constraint element and a datetime element containing an end element and an optional start element. The elements are Extensible Markup Language (XML) elements.

In one embodiment of the invention, the predefined value associated with barring time is zero. It may also have a positive value.

In one embodiment of the invention, the barring time is allowed to become negative to a predefined limit. This is possible as the barring time is decremented by the clock controller means. The predefined limit may be, for example, −10 minutes. This means that the increasing of barring time does not immediately result in barring time that has a positive value, which might result in restrictions in the use of protected media objects, naturally depending on the predefined value associated with barring time. The negative barring time represents an extra tolerance or bonus time that is granted to the user of the electronic device in case there are no observed attempts to circumvent time range protection associated with media objects.

In one embodiment of the invention, the barring time is computed in the electronic device using a notion of behavior points. Barring time may be inversely proportional to behavior points. Negative behavior points are converted to positive barring time in direct proportion and positive behavior points are converted to negative barring time. For example, the conversion may occur so that behavior point balance B is converted to barring time T so that $T=-C \cdot B$ minutes. C is an arbitrary coefficient, the value of which is, for example, one. In this case the predefined value associated with barring time may also be presented as a threshold that is expressed as behavior points. The threshold may have a positive or negative value.

In one embodiment of the invention, the electronic device stores the behavior points in a secure storage, which is not lost when the electronic device is powered off. The secure storage may be, for example, a flash memory.

In one embodiment of the invention, the electronic device checks the availability of time from the second clock and it does not perform the step of checking the barring time if time is available from the second clock. The second clock may get time information from a network, for example, using UMTS Network Information and Time Zone service, which provides current time in notification messages sent to the electronic device. The second clock may get time from content messages or rights messages delivered to the electronic device. For example, the content or rights messages may be carried in UMTS or Global System of Mobile Communications (GSM) short messages to the electronic device. In one embodiment of the invention the first clock is a user interface clock in the electronic device. The user may alter time in the user interface clock at will. For example, the time may be altered via terminal set-up menus in the user interface.

In one embodiment of the invention, the first clock is also a clock, which receives timing information from a network that is not relied upon. This may occur in cases where the network providing timing information is a small and private local area network or a WLAN network. Therefore, the first clock is regarded as insecure.

In one embodiment of the invention, the step of increasing barring time is performed only if the electronic device presently stores rights, which have time range rules in them. The electronic device may perform a further check wherein it checks if it stores rights, which have time range rules that are affected by the observed updating of time in the first clock.

In one embodiment of the invention, the electronic device is a mobile device, for example, a UMTS terminal, a GSM terminal, a GPRS terminal, a WLAN terminal or a terminal within an arbitrary cellular radio system. The terminal may also be a fixed data network or telecommunication network terminal.

In one embodiment of the invention, the computer program is stored on a computer readable medium. The computer readable medium may be a removable memory card, magnetic disk, optical disk or magnetic tape.

In one embodiment of the invention, the electronic device is a mobile device, for example, a laptop computer, palmtop computer, mobile terminal or a personal digital assistant (PDA). In one embodiment of the invention the electronic device is a desktop computer or any other computing device.

The benefits of the invention are associated with improved digital rights management protection. With the invention it is now possible to avoid the circumvention of time based right control simply by manipulating a clock, which provides time for the electronic device.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
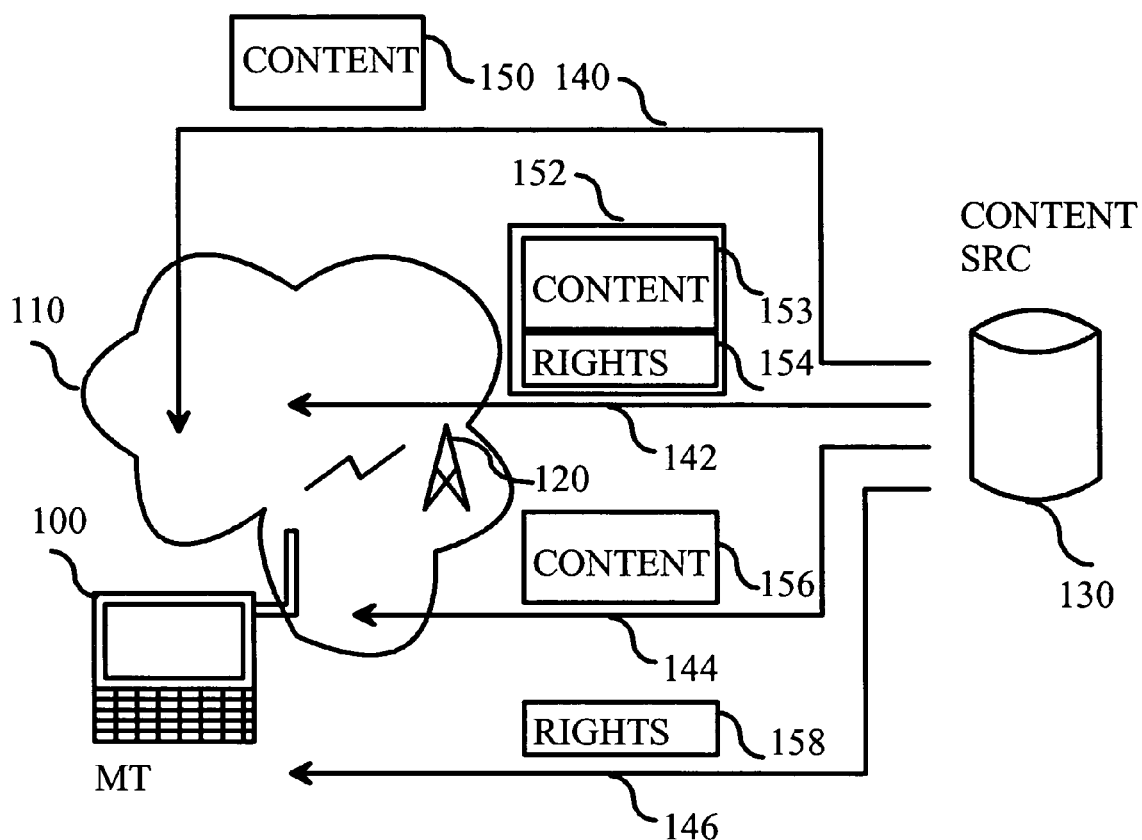
FIG. 1 is a block diagram illustrating DRM content delivery to a mobile terminal in prior art.
Figure 2:
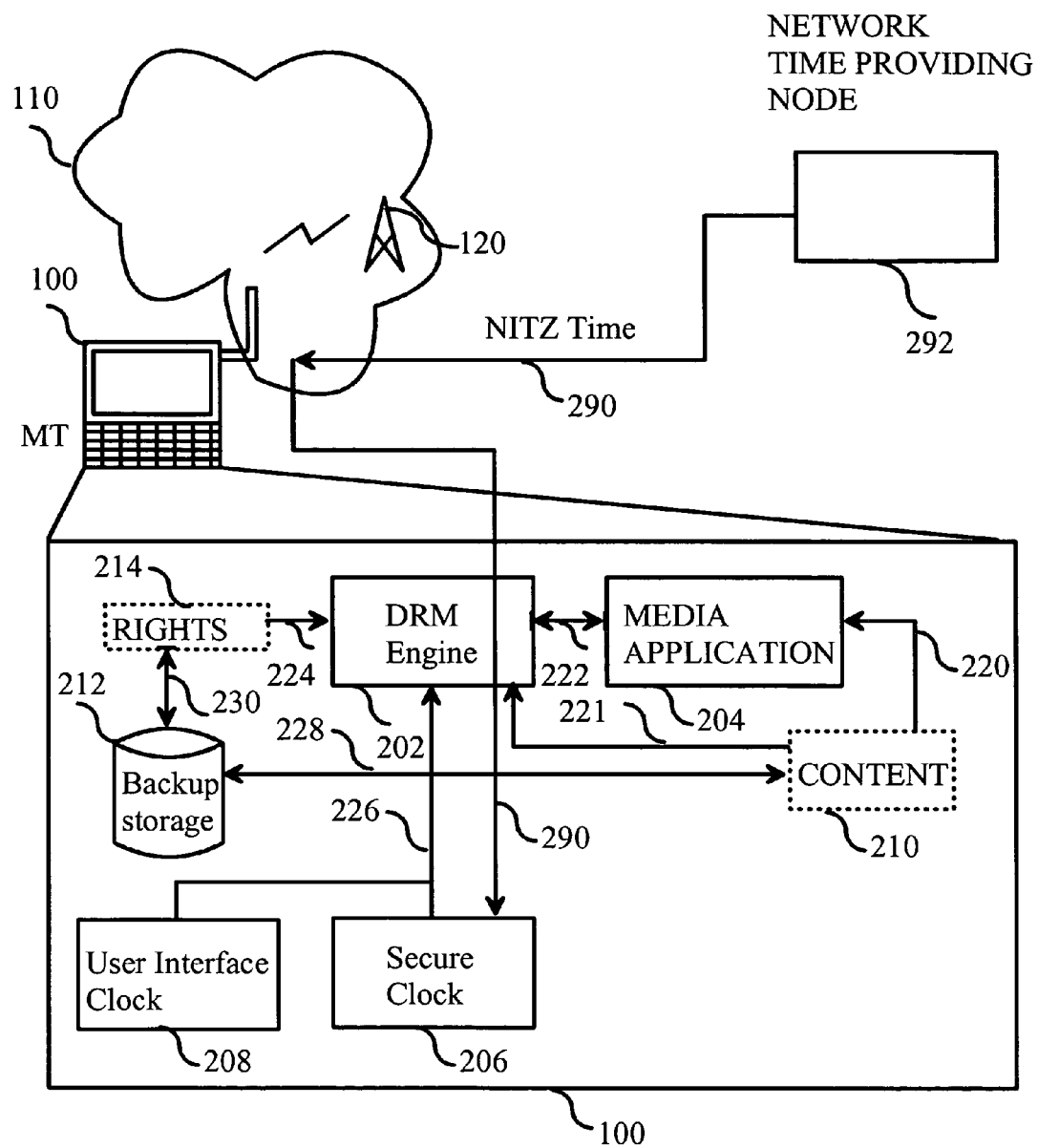
FIG. 2 is a block diagram illustrating prior art system architecture in a mobile terminal supporting DRM.
Figure 3:
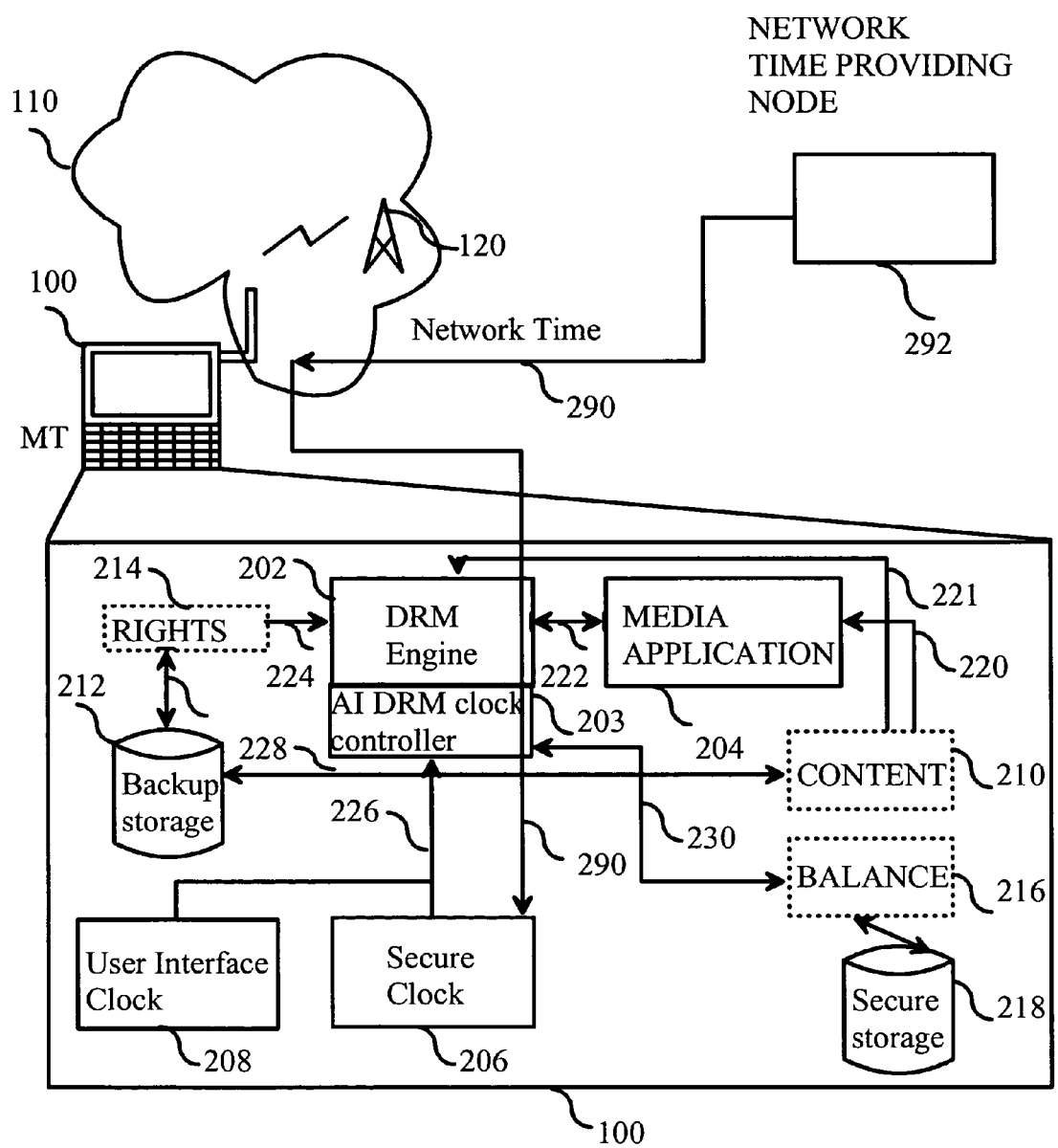
FIG. 3 is a block diagram illustrating system architecture in a mobile terminal supporting DRM, according to the invention.

FIG. 3 is a block diagram depicting system architecture in a mobile terminal (MT) 100 supporting the DRM in one embodiment of the invention. In relation to FIG. 2 some features have been added. In association with a DRM engine 202 there is an intelligent clock controller 203. Intelligent clock controller 203 gets current time and date from either a secure clock 206 or a user interface clock 208, this is depicted using arrow 226. Both clocks may exist simultaneously in one terminal so that user interface clock 208 is used in cases where there is no reliable time available from the network and secure clock 206 in cases where reasonably secure time is available from the network. The secure time from network may be provided, for example, using UMTS Network Information and Time Zone (NITZ) service or any other network time protocol, which is regarded as safe from malicious time altering either in transit from a node 292 or even in node 292. In one embodiment of the invention, MT 100 obtains the secure time from content or rights messages delivered to it via a network 110. In the case of OMA separate delivery model, media objects and REL objects are provided separately to MT 100. They may be sent via different transports. If a media object or a REL object is delivered using a messaging service, which provides reliable time from network, MT 100 updates secure time for secure clock 206 using this reliable time information. The time information provided in a message is in practice the time when the message was sent by a messaging center. An example of such a messaging service is the GSM or UMTS Short Message Service (SMS). In this case the time information is the time when the short message was sent by the SMS service center. If content messages or rights messages that provide reliable time to MT 100 have been received recently enough, secure clock 208 may be considered to be available by intelligent clock controller 203. In this case the node from which the media object or the REL object is provided acts as network time providing node 292. In FIG. 3 there is a behavior point balance 216, which represents behavior points gathered through dubious time fluctuations detected by intelligent clock controller 203. The time fluctuations that result in behavior point reduction are preferably such that they are followed by attempts to play DRM time protected media objects. Balance 216 is incremented by intelligent clock controller 203. Balance 216 is stored to a secure storage 218, which is outside the control of end-user, whereas normal backup storage may be read and used to restore mobile terminal information normally by end-user. The reason for having a separate secure storage such as secure storage 218 is that there must be no possibility for an end-user to overwrite balance 216 using a terminal set-up restoration procedure from a backup storage 212. Therefore, balance 216 must be kept secure using alternative means.

Figure 4:
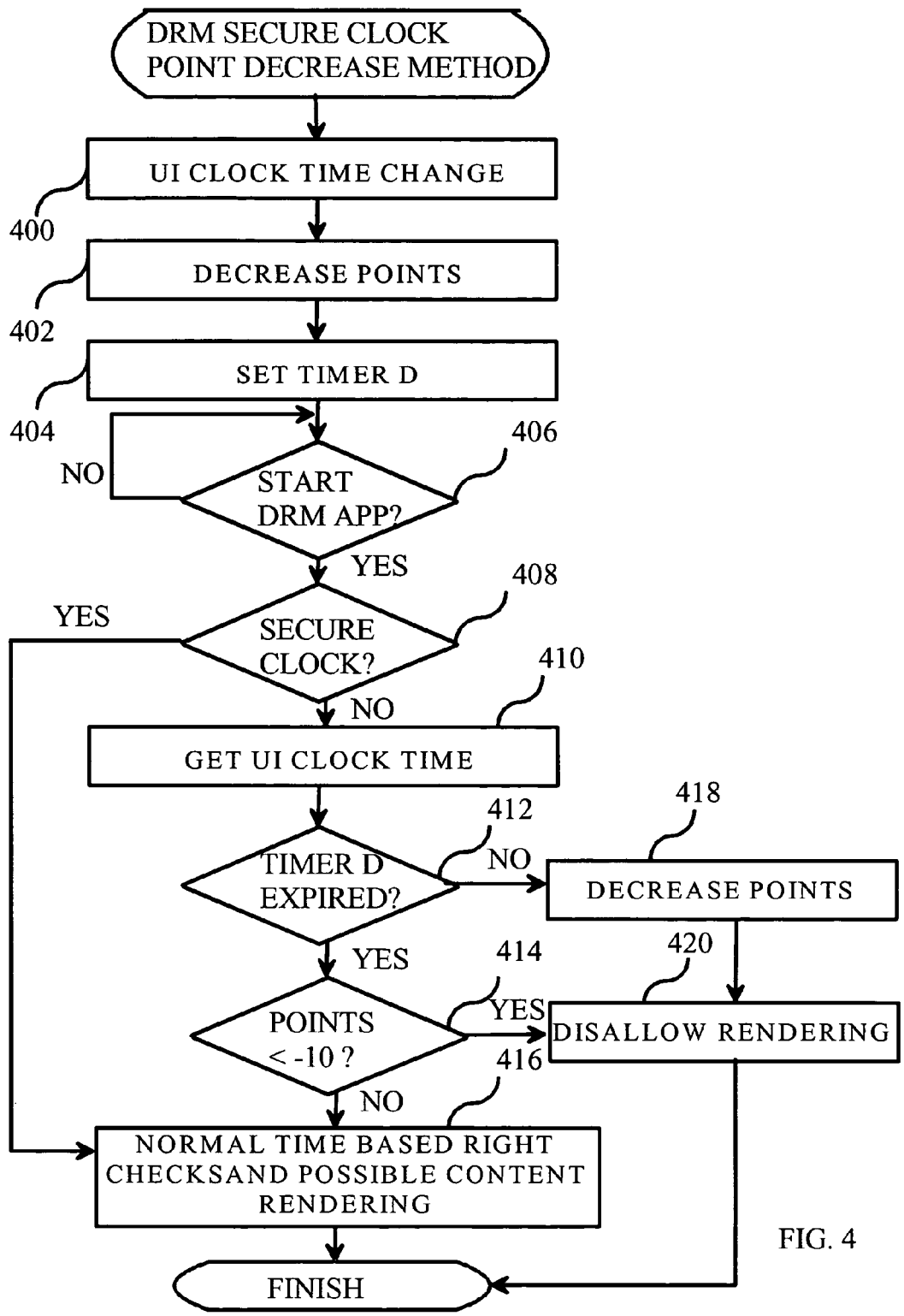
FIG. 4 is a flow chart depicting one embodiment of time update method in an intelligent clock, according to the invention.

FIG. 4 is a flow chart depicting one embodiment of time updating method in an intelligent clock in a system architecture illustrated in FIG. 3. At step 400 a mobile terminal 100 user interface clock 208 has been updated. Hereinafter by a user interface clock is meant a clock, which is susceptible for time update attacks either from network or from user interface. The time update attacks are an example of time attack events. Intelligent clock controller 203 gets notified of time update pertaining user interface clock 208. At step 402 intelligent clock controller 203 checks how much time has been updated in either direction. In one embodiment of the invention, if a time update does not exceed a predefined limit it may be considered insignificant for DRM attacks and may be ignored. In one embodiment of the invention, intelligent clock controller may also keep record of all DRM REL objects currently stored in MT 100. If there are no DRM REL objects stored in MT 100, which would have time range rules specified, intelligent clock controller 203 may also decide to ignore the update. At step 404 intelligent clock controller 203 starts a timer D. The timer D is set to a value in which a DRM application may not be started. In one embodiment, for the timer D does not count the playing of media objects, which do not have time range rules specified in their REL objects. At step 406 MT 100 waits for the starting of DRM application, that is, DRM engine 202. At step 408 it is checked if secure clock 206 is available. This decision may be based on, for example, whether MT 100 has radio coverage from a cellular radio system that is providing reliable network time. There may be temporary abruptions in radio coverage, which do not count for the reliability of network time provided from the cellular radio system. If secure clock 206 is available, DRM engine 202 proceeds with the normal checking of time based rights and possible rendering of content for the user.

At step 410 intelligent clock controller 203 gets time from user interface clock 208. At step 412 intelligent clock controller 203 checks whether the timer D has expired. If the timer D has not expired at step 418 behavior points are decreased. If the timer D has expired, at step 414 intelligent clock controller 203 checks if behavior point balance 216 is less than a specified threshold value. The threshold value may be, for example, −10. Alternatively the threshold value may be, for example, 0. If behavior point balance 216 is less than the threshold value, it is an indication that user has a previous history of attempts to attack time range based DRM protection via malicious time updates. If behavior point balance 216 is less than the threshold value, the rendering of content, that is, the presentation of media object for the user is not allowed. The user is notified about the disallowing of content rendering at step 420. In one embodiment of the invention, if the presentation of a media object is disallowed due to the fact that behavior point balance 216 is less than the threshold value, MT 100 is put to a locked state, which involves that the presentation of media objects, which have time based rules associated with them, is not allowed in MT 100. In one embodiment of the invention MT 100 is put to the locked state also due to the fact that the checking of the timer D expiry reveals that it has not yet expired. The locked state may be released by receiving a specific unlock message to MT 100, for example, via network 110. MT 100 verifies the unlock message, for example, by checking whether it contains a proper unlocking key or by checking the origin of the unlock message. The unlock message may be authenticated by MT 100, for example, using data origin authentication. The unlock message may be carried to MT 100, for example, using a GSM short message or as an instant message. Alternatively, the locked state may be released by entering an unlocking code to MT 100 via user interface. If behavior point balance 216 is greater than the threshold value, DRM engine 202 is allowed by intelligent clock controller 203 to continue with checking REL object 214 that is associated with requested DRM protected media object 210. This is done at step 416.

Figure 5:
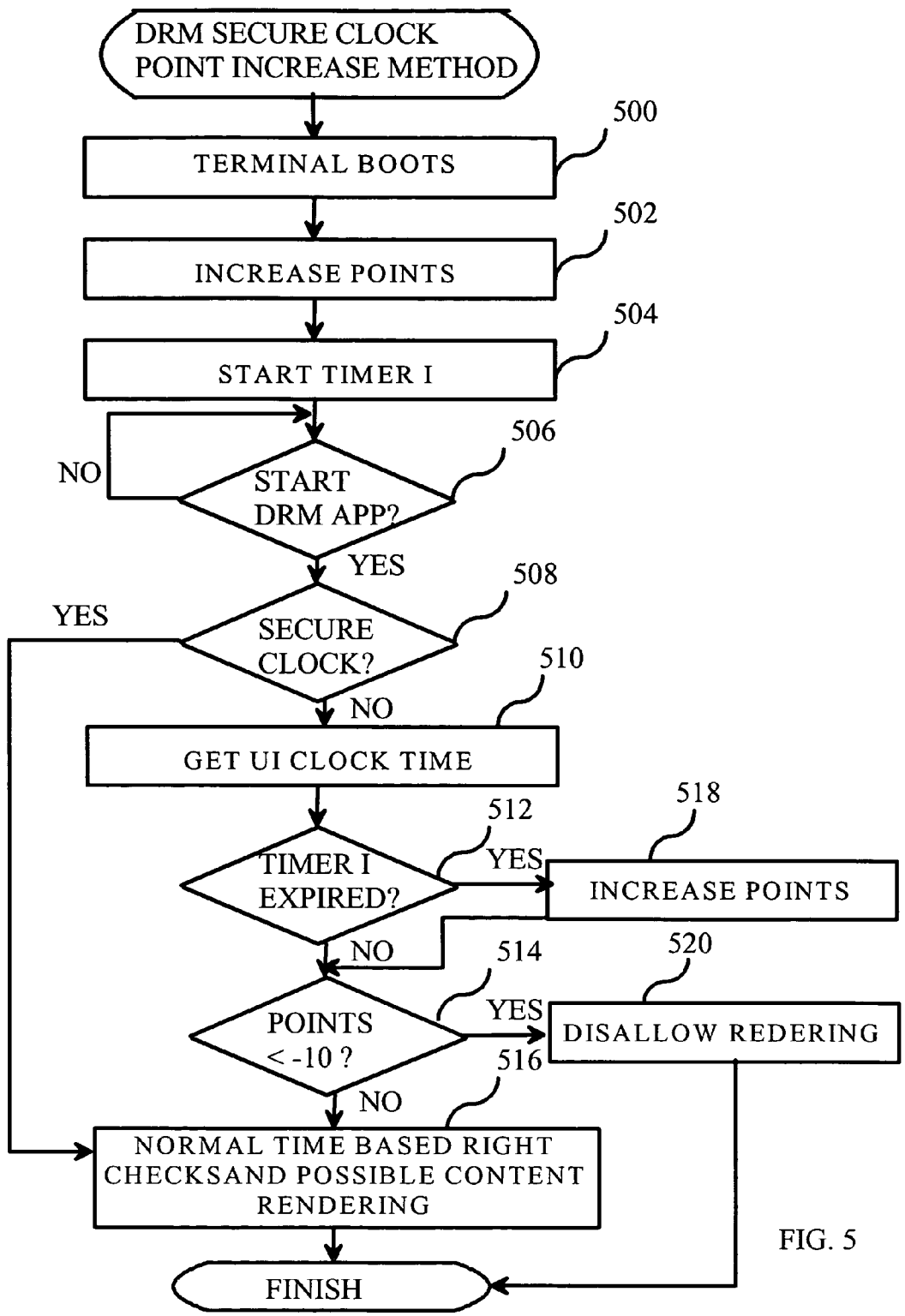
FIG. 5 is a flow chart depicting one embodiment of behavior point increasing, according to the invention.

FIG. 5 is a flow chart depicting one embodiment of behavior point increase method in an intelligent clock in a system architecture illustrated in FIG. 3. At step 500 mobile terminal 100 performs startup. For example, it is powered on or it has been rebooted. At step 502 behavior point balance 216 is increased immediately by an initial number of points. For example, the initial number may be 10 points. In one embodiment of the invention the behavior point balance 216 is set to zero. At step 504 MT 100 starts a timer I. Timer I represents the time, in which behavior points are gathered a given number. The time for timer I may be adjusted depending on how quickly the DRM system forgives malicious attempts to manipulate user interface clock 208 time. By a malicious attempt is meant in this context an attempt, which has relevance for DRM system and time range protected media objects. In other words, the barring time during which no time range protected DRM media objects can be presented for the user is directly proportional to the timer I value. At step 506 MT 100 waits until DRM application including DRM engine 202 and intelligent clock controller 203 is started. At step 508 intelligent clock controller 203 checks if secure clock 206 is available, if it is available execution continues at step 516 normally. If secure clock 206 is not available, at step 510 intelligent clock controller 203 gets user interface clock 208 time. At step 512 intelligent clock controller 203 checks if timer I has expired. If it has expired, at step 518 intelligent clock controller 203 increases behavior point balance 216 by a specified number of points, for example, 10 points. At step 514 intelligent clock controller 203 checks whether behavior point balance 216 is greater than or equal to the specified threshold value, for example −10. If behavior point balance 216 is less than the threshold value content rendering, that is, the presentation of media object for the user is not allowed by DRM engine 202. If behavior point balance 216 is greater than or equal to the threshold value, DRM engine 202 is allowed by intelligent clock controller 203 to continue with checking REL object 214 that is associated with requested DRM protected media object 210.

In one embodiment of the invention, intelligent clock controller 203 and DRM engine 202 get automatically invoked by mobile terminal operating system whenever the timer I expires. In this embodiment intelligent clock controller 203 just increases the behavior point balance 216 with specified plus points, for example 10 points and exits. Therefore, in this embodiment there is no need to include the steps of starting DRM application, getting of user interface clock time, checking of behavior point balance 216, checking of REL object and any media object rendering related tasks to the increasing of behavior points.

Figure 6:
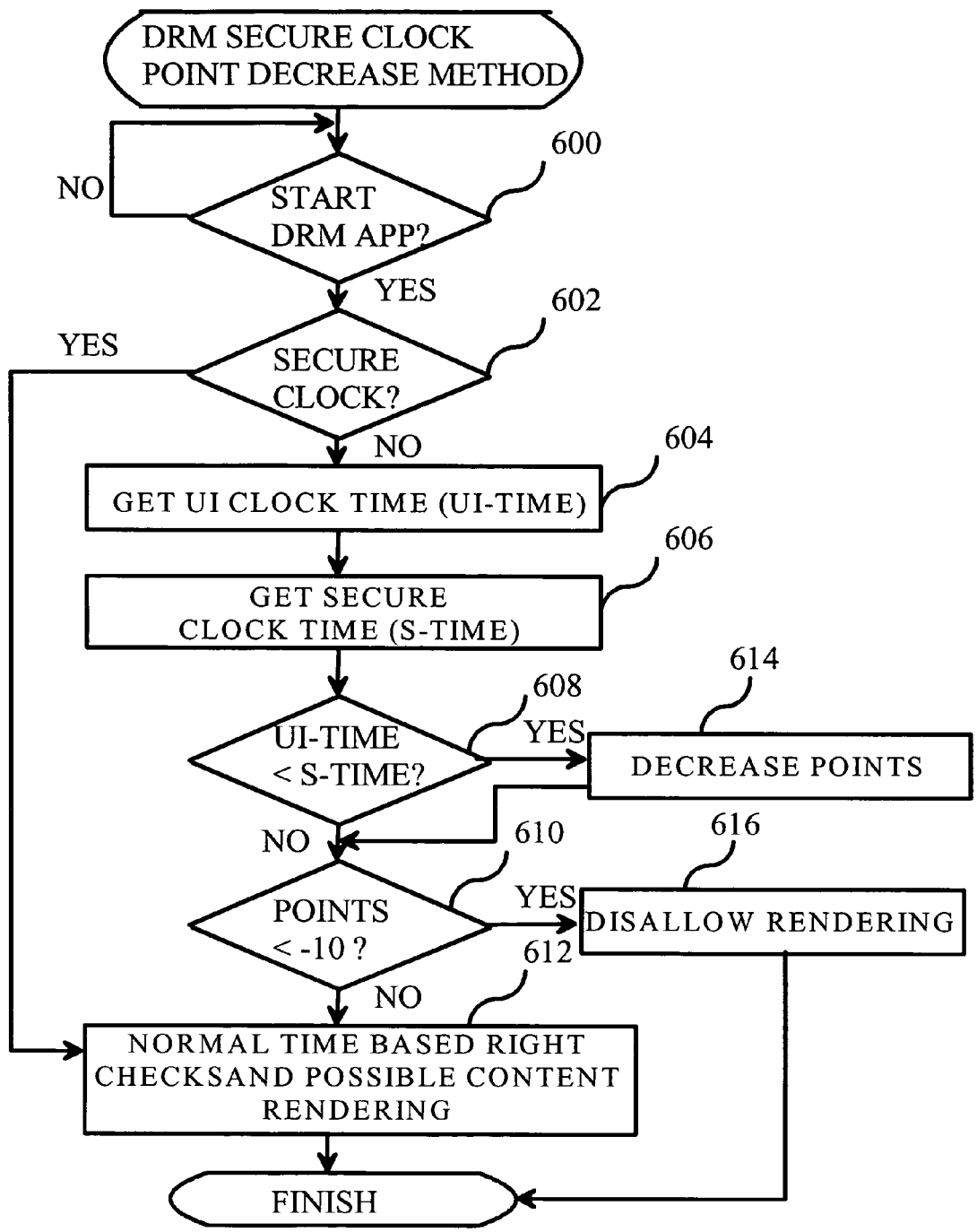
FIG. 6 is a flow chart depicting one embodiment of behavior point decreasing, according to the invention.

FIG. 6 is a flow chart depicting one embodiment of decreasing behavior points in an intelligent clock in a system architecture illustrated in FIG. 3. At step 600 MT 100 waits for the starting of DRM application, that is, DRM engine 202. At step 602 MT 100 checks if secure clock 206 is available. By secure clock availability is meant in this case, for example, the availability of fresh time from secure clock 206. The time in secure clock 206 may be considered fresh, if time updates have been received recently enough from network time providing node 292. Time updates have typically been received recently enough if MT 100 has continuously been connected to the network 110. If secure clock 206 is available, MT 100 proceeds with normal checking of time based rights and possible content rendering for the user. At step 604 intelligent clock controller 203 gets time from user interface clock 208. At step 606 intelligent clock controller 203 gets time from secure clock 206. It should be noted that due to the fact that time from secure clock 206 is no longer considered to be available, the time in secure clock 206 may be ahead of or behind actual network time. At step 608 intelligent clock controller 203 compares time from user interface clock 208 and secure clock 206. If the time from user interface clock 208 is behind the time from secure clock 208, it is an indication of a possible time attack event. In one embodiment of the invention, at step 608 it is checked by intelligent clock controller 203, if the difference between the time from user interface clock 208 and secure clock 208 exceeds a predefined value. Only if this predefined value is exceeded, the time from user interface clock 208 is considered to be behind time from secure clock 206. At step 614 behavior point balance 216 is decreased a predefined number of points by intelligent clock controller 203. For example, behavior point balance 216 may be decreased 10 points.

At step 610 intelligent clock controller checks if behavior point balance 216 is less than a specified threshold value. The threshold value may be, for example, −10. Alternatively the threshold value may be, for example, 0. If behavior point balance 216 is less than the threshold value the rendering of content, that is, the presentation of media object for the user is not allowed. The user is notified about the disallowing of content rendering at step 616. In one embodiment of the invention, if the presentation of a media object is disallowed due to the fact that behavior point balance 216 is less than the threshold value, MT 100 is put to a locked state, which involves that the presentation of media objects, which have time based rules associated with them, is not allowed in MT 100. If behavior point balance 216 is greater than the threshold value, DRM engine 202 is allowed by intelligent clock controller 203 to continue with checking REL object 214 that is associated with requested DRM protected media object 210. This is done at step 612.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   detecting a time attack event in an apparatus in response to detecting an altering of time in a first clock and an attempt to present at least one protected media object;
   increasing a barring time in response to said time attack event;
   checking availability of time from a second clock in said apparatus, wherein said second clock is adjusted based on time information from a network;
   checking said barring time at a request to present at least one media object, if time is not available from said second clock; and
   presenting at least one media object if it is allowed by rights associated with said at least one media object and said barring time does not exceed a predefined value.

2. The method according to claim 1, wherein said altering of time is detected when last time signal received from a network indicates a time that is later than time in said first clock.

3. The method according to claim 1, wherein said increasing said barring time is performed only if said apparatus stores rights, which have time range rules in them and the time rules are affected by said updating of time in said first clock.

4. The method according to claim 1, wherein said altering of time is detected when time in said first clock has been updated and said an attempt to present at least one protected media object occurs within a predefined time period.

5. The method according to claim 1, wherein said barring time is allowed to become negative to a predefined limit.

6. The method according to claim 1, wherein said barring time is computed in said apparatus by setting said barring time to a value that is inversely proportional to behavior points stored by said apparatus.

7. The method according to claim 1, wherein increasing said barring time is performed only if said apparatus stores rights, which have time range rules in them.

8. The method according to claim 1, wherein said barring time is decreased regularly.

9. The method according to claim 1, wherein said predefined limit associated with said barring time has a positive value.

10. An apparatus comprising:
    a first clock;
    a clock controller configured to detect a time attack event, in response to detecting an altering of time in said first clock and an attempt to present at least one protected media object, and configured to increase a barring time in response to said time attack event;
    a second clock, which is adjusted based on time information from a network;
    a clock controller configured to check availability of time from said second clock; and
    a digital rights management engine configured to check whether said barring time exceeds a predefined value if a time from said second clock is not available, and whether a request to present at least one protected media object is detected by said digital rights management engine.

11. The apparatus according to claim 10, wherein said clock controller is configured to detect said altering of time when a last time signal received from a network indicates a time that is later than time in said first clock.

12. The apparatus according to claim 10, wherein said clock controller is configured to detect said altering of time when time in said first clock is updated and said an attempt to present at least one protected media object occurs within a predefined time period after said updating of the time in said first clock.

13. The apparatus according to claim 12, wherein said clock controller is configured to increase said barring time only if said apparatus stores rights which have time range rules in them and the time rules are affected by said updating of time in said first clock.

14. The apparatus according to claim 10, wherein said barring time is allowed to become negative to a predefined limit.

15. The apparatus according to claim 10, wherein said clock controller and digital rights management engine are configured to compute said barring time by setting said barring time to a value that is inversely proportional to behavior points stored by said apparatus.

16. The apparatus according to claim 10, wherein said clock controller is configured to increase said barring time only if said apparatus stores rights which have time range rules in them.

17. The apparatus according to claim 10, wherein said apparatus further comprises a secure storage for said barring time.

18. The apparatus according to claim 10, wherein said apparatus is a mobile device.

19. The apparatus according to claim 10, wherein said clock controller is also configured to decrease said barring time regularly.

20. The apparatus according to claim 10, wherein said predefined value associated with barring time is greater than zero.

21. A computer readable medium encoded with code, which when executed by a processor perform:

detecting a time attack event in an apparatus in response to detecting an altering of time in said first clock and an attempt to present at least one protected media object;

increasing a barring time in response to said time attack event;

checking availability of time from a second clock in said apparatus, wherein said second clock is adjusted based on time information from a network;

checking said barring time at a request to present at least one media object, if time is not available from said second clock; and presenting at least one media object if it is allowed by rights associated with said at least one media object and said barring time does not exceed a predefined value.

22. The computer readable medium according to claim 21, wherein said altering of time is detected when a last time signal received from a network indicates a time that is later than time in said first clock.

23. The computer readable medium according to claim 21, wherein said altering of time is detected when time in a first clock has been updated and said attempt to present at least one protected media object occurs within a predefined time period.

24. The computer readable medium according to claim 23, wherein increasing barring time is performed only if said apparatus stores rights, which have time range rules in them and the time rules are affected by said updating of time in said first clock.

25. The computer readable medium according to claim 21, wherein said barring time is allowed to become negative to a predefined limit.

26. The computer readable medium according to claim 21, wherein said barring time is computed in said apparatus by setting said barring time to a value that is inversely proportional to behavior points stored by said apparatus.

27. The computer readable medium according to claim 21, wherein increasing barring time is performed only if said apparatus stores rights, which have time range rules in them.

28. The computer readable medium according to claim 21, wherein said apparatus has a secure storage for said barring time.

29. The computer readable medium according to claim 21, wherein said apparatus is a mobile device.

30. The computer readable medium according to claim 21, wherein said barring time is decreased regularly.

31. The computer readable medium according to claim 21, wherein said computer readable medium is a removable memory card.

32. The computer readable medium according to claim 21, wherein said computer readable medium is a magnetic or optical disk.

33. An apparatus comprising
a first clock;
means for detecting a time attack event, in response to detecting an altering of time in said first clock and an attempt to present at least one protected media object, and configured to increase a barring time in response to said time attack event;
a second clock, which is adjusted based on time information from a network;
means for checking availability of time from said second clock; and
means for checking whether said barring time exceeds a predefined value if a time from said second clock is not available, and whether a request to present at least one protected media object is detected by it.

* * * * *